United States

Schafft 4,113,352

Sep. 12, 1978

[54] ELECTRO-OPTIC MATRIX DISPLAY

[75] Inventor: Hugo Willy Schafft, Des Plaines, Ill.

[73] Assignee: Motorola, Inc., Schaumburg, Ill.

[21] Appl. No.: 756,216

[22] Filed: Jan. 3, 1977

[51] Int. Cl.$^2$ .............................................. G02F 1/03
[52] U.S. Cl. .................................................. 350/150
[58] Field of Search ........................................ 350/150

[56] References Cited

U.S. PATENT DOCUMENTS 3,737,211    6/1973    Cutchen et al. ...................... 350/150

OTHER PUBLICATIONS

Séquin et al. Charge Transfer Devices, Academic Press, Inc., New York, ®1975, p. 33.

*Primary Examiner*—John K. Corbin
*Assistant Examiner*—R. A. Rosenberger
*Attorney, Agent, or Firm*—Victor Myer; James W. Gillman

[57] ABSTRACT

An electro-optic display device using an electro-optic plate operating in the transverse bias mode selectively transmits light. A first conductor having an aperture is formed on one side of the plate and is overlaid with an insulating layer. A second conductor is formed over the insulating layer and crosses over the first conductor. The second conductor also has apertures generally aligned with the apertures in the first conductor and separated by a portion of the conductor extending to the surface of the electro-optic plate. An arrangement of first and second conductors may be disposed to have the apertures form an addressable dot-matrix display.

10 Claims, 4 Drawing Figures

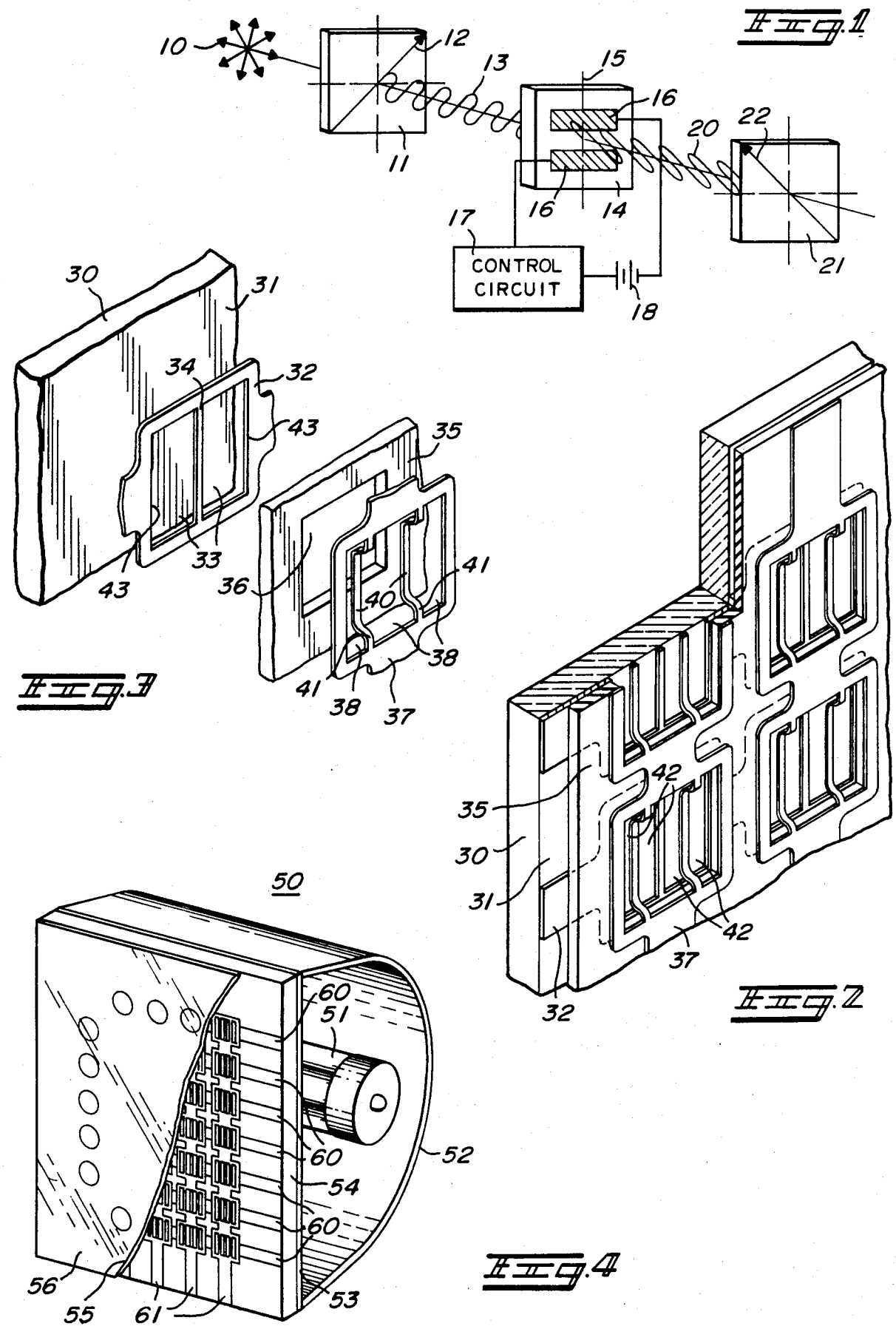

ELECTRO-OPTIC MATRIX DISPLAY

BACKGROUND OF THE INVENTION

1. Field of the Invention

This invention pertains to the field of displays, particularly to those displays utilizing an electro-optic plate operable in the transverse bias mode and having cross-over electrodes disposed on one side of the plate.

2. Description of the Prior Art

Recent developments in electro-optic materials have rendered these materials more useful as display devices. Developments have occurred in the class of transparent ferro-electric ceramic materials such as lanthanum modified lead zirconate titanate (PLZT) to produce materials with high optical transparency, significant electro-optic characteristics, high electromechanical coefficients, and ceramic structures of a polycrystalline nature. Use of these improved materials in display devices has now become more feasible and requires methods and structures to allow such use, for example, in the display device of the instant invention. A wide variety of applications have been proposed using electro-optic material, for example, as protective goggles for welders, as a photographic electronic shutter, as an optical switch, as a variable density transmission window, and as a color filter.

A prior art device using an electo-optic material, such as PLZT, is described in U.S. Pat. No. 3,737,211. A variable density optical filter is described in that patent operating in the transverse mode (the optic axes being transverse to the direction of light propagation). An interdigital array of co-planar electrodes is described as being positioned on one side of a thin ceramic wafer with an electric field being impressed between the electrodes. In the zero-field condition, light is not transmitted through a pair of crossed polarizers because the ceramic material is optically isotropic. When a polarizing voltage is applied, the electro-optic material provides a retardation of the light so that a component of the light is passed by the second of the crossed polarizers.

SUMMARY OF THE INVENTION

It is an object of the present invention to provide an improved electro-optic display device operating in the transverse bias mode.

It is a further object of this invention to provide an improved display having first and second crossing conductors with apertures therein, portions of the conductors being adapted to have a relatively low electric potential impressed therebetween, allowing light to be transmitted through the electro-optic plate.

It is a further object of the invention to provide a series of cross-over conductors having apertures, which conductors can be arranged to have the apertures organized into a matrix display so the predetermined areas of any electro-optic plate can be selectively activated to provide for the transmission of light through the selected area.

Briefly, the invention consists of an electro-optic plate operable in the transverse bias mode. A first conductor and a second conductor insulated from each other and crossing over each other contain substantially coincident apertures at the cross-over point. At the cross-over point portions of each conductor are adapted to lie along the plate and to have an electric field impressed therebetween. According to this invention, a predetermined area of the electro-optic plate is adapted to be selectively activated in the transverse bias mode by application of a voltage potential between certain first and second cross-over conductors. Display devices according to this invention may further include a series of first and second cross-over conductors arranged on one side of an electro-optic plate in a predetermined configuration, such as a dot-matrix display.

BRIEF DESCRIPTION OF THE DRAWINGS

For a more complete understanding of the invention, reference should be made to the drawings in which:

FIG. 1 is a diagramatic view, partially in perspective, of a basic electro-optic display system operating in the transverse mode.

FIG. 2 is a perspective, partial cross-sectional assembled view of a display device according to the invention.

FIG. 3 is an exploded perspective view of portions of an electro-optic plate, of the first and second conductors, and of an insulating layer.

FIG. 4 is a perspective view of a dot-matrix display system embodiment of the invention.

DESCRIPTION OF THE PREFERRED EMBODIMENT

PLZT ceramics exhibit optically uniaxial properties on a microscopic scale and also on a macroscopic scale when activated by an electric field. Uniaxial crystals have one unique axis of symmetry located along the optic axis. This axis is co-linear with the ferro-electric polarization vector in ceramic PLZT and has different optical properties than the two other orthogonal axes. Light travelling in an activated PLTZ crystal along the optic axis and vibrating in a direction perpendicular to that axes will have a different index of refraction than light travelling in a direction perpendicular to the optic axes and vibrating in a direction parallel to that axis. The difference between the two indices of refraction is defined as birefringence. On a macroscopic scale, the birefringence of a material equals zero before an appropriate elctrical field is applied. Linearly polarized light upon entering a birefringent material is effectively resolved into two perpendicular components. The propagation velocities of the two components are different within the material because of the different indices of refraction. The different propagation velocities of the two components result in a phase shift called retardation, retardation being equal to the product of the birefringence and the thickness of the material. A retardation of one half wave length is achieved for one component with respect to the other component when a particular electric potential is applied to a material. This results in the rotation of the resultant vibration direction of the linearly polarized light by 90° and allows light to be transmitted by a second polarizer aligned at right angles to a first polarizer, the first polarizer being used to initially polarize the light. Switching of the elctro-optic ceramic from a state where the retardation equals zero to a state where the retardation equals one-half wave length enables light passing through a birefringent material to be gated on and off.

The basic modes of operation currently used in electro-optic devices are the transverse and the longitudinal modes. In the longitudinal mode of operation, the electroc field is applied in a direction parallel to the viewing direction and through the thickness of the electro-optic plate, necessitating the use of transparent electrodes. In the transverse mode, the electric field is applied normal to the viewing direction by means of electrodes located on one surface of the electro-optic plate with light being transmitted through the gap between the electrodes.

FIG. 1 shows a basic electro-optic display system operating in the transverse mode. A randomly polarized light source 10 serves as a source of light, the light passing through a polarizer 11, having a polarization axes 12. The polarizer 11 transmits components of the light from source 10 which are aligned with the polarization axes 12, as represented by a polarized light waveform 13 as shown in FIG. 1. The polarized light then passes through a PLZT electro-optic plate 14 which is ordinarily transparent to light waves and which has an optic axes 15. In order to operate in a transverse mode, the PLZT electro-optic plate 14 has a pair of interdigitated electrodes 16 deposited thereupon. A control circuit 17 applies an electric potential from a voltage source 18 to the pair of electrodes 16, thereby impressing the electric potential across selected areas of the plate 14 and rendering the material between the electrodes 16 birefringent. This results in retardation and a phase shifting of the polarized light waveform 20 as shown in FIG. 1. An analyzer 21 polarized along an axis 22 perpendicular to axis 12 passes the phase-shifted polarized light waveform 20.

Referring to FIGS. 2 and 3, an electro-optic plate 30 is shown formed of an electro-optic material such as PLZT and prepared so as to be optically transparent and exhibit birefringence in response to control potentials applied thereto. The plate 30 has a relatively thin cross-sectional area with generally parallel, optical quality surfaces. A first side 31 of the plate 30 has a first conductor 32 thereupon and in contact with the first surface 31. The first conductor 32 contains first apertures 33, separated by a strip 34 of the first conductor. The first conductor can be formed, for example, by metal layer deposition techniques, commonly used in semiconductor device fabrication.

An insulating layer 35 is superposed over the first conductor 32 and contains an aperture 36 therein. The aperture 36 is located generally over the first apertures 33 of the first conductor 32. The insulating layer is formed from a dielectric material such as, for example, silicon dioxide and may be deposited over the first conductor 32 using well-known semiconductor fabrication techniques.

A second conductor 37 is located in a different plane than the first conductor 32 and is separated from the first conductor 32 by the insulating layer 35. The second conductor 37 crosses over the first conductor 32 at a location roughly defined by the insulating layer aperture 36 and the first apertures 33. Conductor 37 at the cross-over location contains second apertures 38 which are substantially in alignment with the first apertures 33 of the first conductor 32 and the aperture 36 of the insulating layer 35. The second conductor 37 may be formed by metal deposition techniques, well-known in the semiconductor fabrication art, over the insulating layer 35. Strips 40 are formed to lie on the first side 31 of the plate 30 and to extend from the main part of the second conductor 37, being connected by extending portions 41 of the second conductor. The strips 40 of the second conductor and the strip 34 of the first conductor are aligned along the surface 31 of the plate 30 as to be generally parallel with each other. When an electric potential is applied between the first and second conductors, activated regions 42 as shown in FIG. 2 are subjected to the field created by that potential and exhibit a birefringent characteristic, causing a consequent retardation and resultant phase shift of the light passing through the activated regions 42 of the plate 30.

Edges 43 of the first conductor 32 shown in FIG. 3 lying adjacent to the apertures 33 and opposite the strip 34 serve in combination with strips 40 of the second conductor 37 to provide a potential difference across the area of the plate defined by the outermost of the second conductor apertures 38. Thus, the entire area of the plate 30, being roughly defined by the aperture 36, can be activated to a birefringent state by application of a potential difference between the first conductor 32 and the second conductor 37.

Since the electro-optic plate 30 has a high resistivity, negligible current will be drawn through the first and second conductors. This permits the first and second conductors to be thin. For this reason the strips 34, 40 can also be made long and thin. The electric field strength required to drive a type 9065 (Manufactured by Motorola, Inc.) PLZT material into a birefrigent conduction is approximately 25 volts per thousandth of an inch. Switching devices to drive the first and second conductors are less costly if less than 100 volts of voltage drive is required from the switching devices. A spacing of less than four-thousandths of an inch between electrodes together with a 10:1 ratio between the width of the strips 34, 40 and the aperture openings can be maintained so to provide sufficient area for passage of light while requiring only a 100 volt potential between conductors.

A series of first and second conductors insulated from each other and having apertures and strips as described above can be disposed to have the apertures arranged in a predetermined configuration for use as a dot-matrix display 50 as shown in FIG. 4. A flourescent light source 51 is contained within a reflector housing 52, causing the light to be concentrated upon a display polarizer 53. The display polarizer 53 has its polarization axis at right angles to the polarization axis of a display analyzer 55 positioned near the front face 56 of the display. A display electro-optic plate 54 has disposed on it a series of conductors similar to the first conductor 32 and the second conductor 37 so as to form a five by seven dot-matrix display. The conductors are arranged into a series of row electrodes 60 and a series of column electrodes 61. An individual dot, or dots, can be addressed by application of a voltage between the corresponding row and column electrodes as is well-known in the art. When the proper voltage is applied between one of the row electrodes 60 and one of the column electrodes 61, the area of the electro-optic plates 54 corresponding to the intersection of the electrodes is made birefrigent. This causes the light passing through the plate to be rotated 90° and to pass through the analyzer 55. Thus, a particular predetermined area, or dot, of the display may be activated by selective application of control voltages.

While a particular embodiment of the invention has been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. An electro-optic display device for selectively transmitting light comprising:
   an electro-optic plate operable in the transverse bias mode;
   a plurality of first conductors, located on a side of the plate, each first conductor having a plurality of predeterminedly spaced apertures provided therein;
   an insulating layer superposed over said first conductors and having provided apertures substantially coincident with the apertures of the first conductors; and
   a plurality of second conductors insulated from said first conductors by said insulating layer, said second conductors being generally superjacent to and crossing said first conductors, each of said second conductors having a plurality of apertures substantially coincident with predetermined apertures of the first conductor, each of said second conductors having contacting portions extendingg from each second conductor and lying on said side of the plate in predetermined electrical configuration with predetermined ones of said first conductors;
   whereby a predetermined area of the electro-optic plate is adapted to be selectively activated in the transverse bias mode by application of an electric potential between selected ones of the first and second conductors.

2. The device of claim 1 further comprising a pair of polarizers positioned on opposite sides of the electro-optic plate.

3. The device of claim 2 further comprising the pair of polarizers having perpendicular axes of polarization.

4. The device of claim 1 wherein the insulating layer is silicon dioxide.

5. The display device of claim 1 further comprising said plurality of first conductors arranged to form a plurality of substantially parallel rows and said plurality of second conductors arranged to form a plurality of substantially parallel columns with the apertures of said conductors disposed in a predetermined configuration.

6. The device of claim 5 comprising an addressing means for applying electric potentials to selected pairs of the first and second conductors.

7. The device of claim 1 further comprising:
   each first conductor having a plurality of apertures formed therein, said apertures being separated by a strip of the first conductor;
   each second conductor having a plurality of apertures formed therein, said apertures being separated by positions extending from the second conductor.

8. The device of claim 7 wherein the strip and extending portions of the conductors are formed to be relatively thin with respect to the aperture widths.

9. The device of claim 7 wherein the strip and extending portions lie generally parallel to each other.

10. An electro-optic display device for selectively transmitting light comprising:
    an electro-optic plate operable in the transverse bias mode;
    a predetermined arrangement of first conductors, located on a side of the plate, each conductor having first apertures formed therein, said first apertures being separated by a strip of each first conductor;
    an insulating layer superposed over the first conductors having apertures substantially coincident with the apertures of the first conductors;
    a predetermined arrangement of second conductors insulated from said first conductors, each of said second conductors having second apertures substantially coincident with predetermined first apertures of the first conductors, said second apertures being separated by a strip of each second conductor, which strip of each second conductor extends from said second conductor and lies on said side of the plate;
    whereby a predetermined area of the electro-optic plate is adapted to be selectively activated in the transverse bias mode by application of an electric potential between selected ones of the first and second conductors.

* * * * *